Patented Feb. 19, 1952

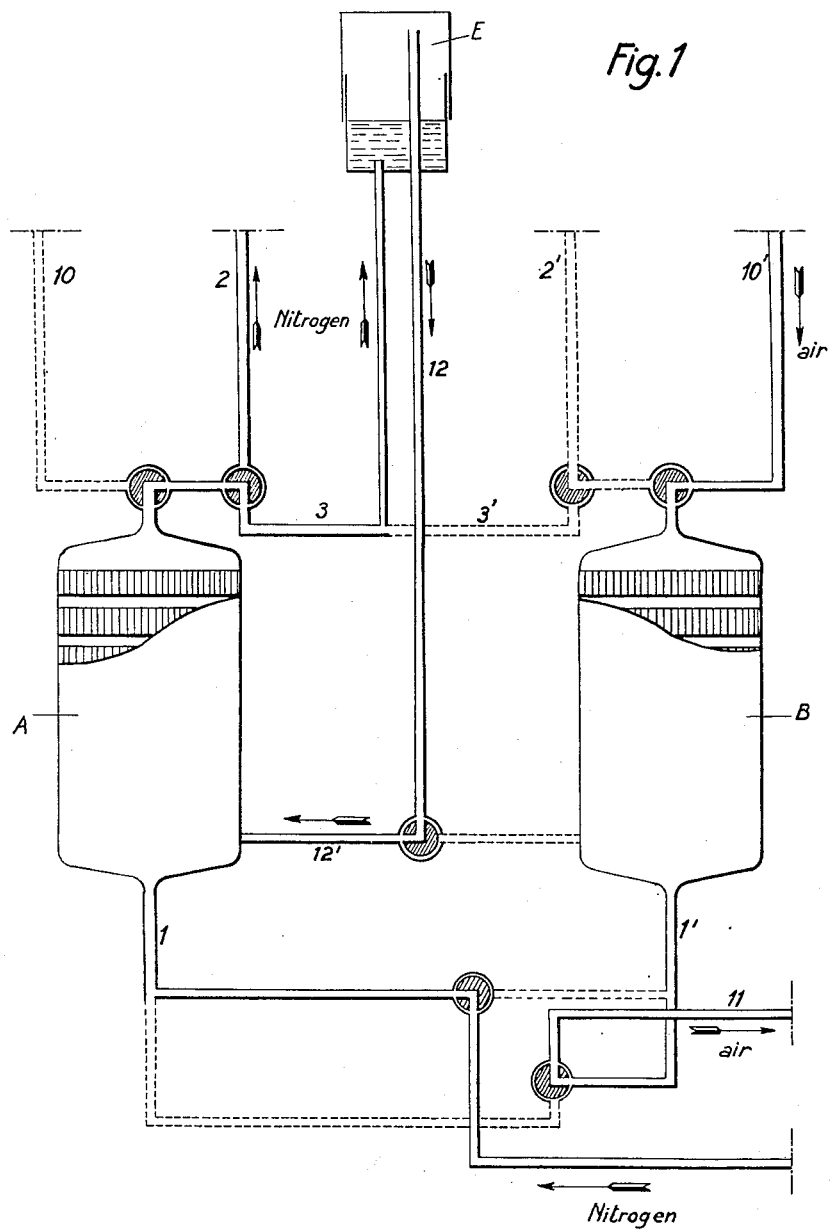

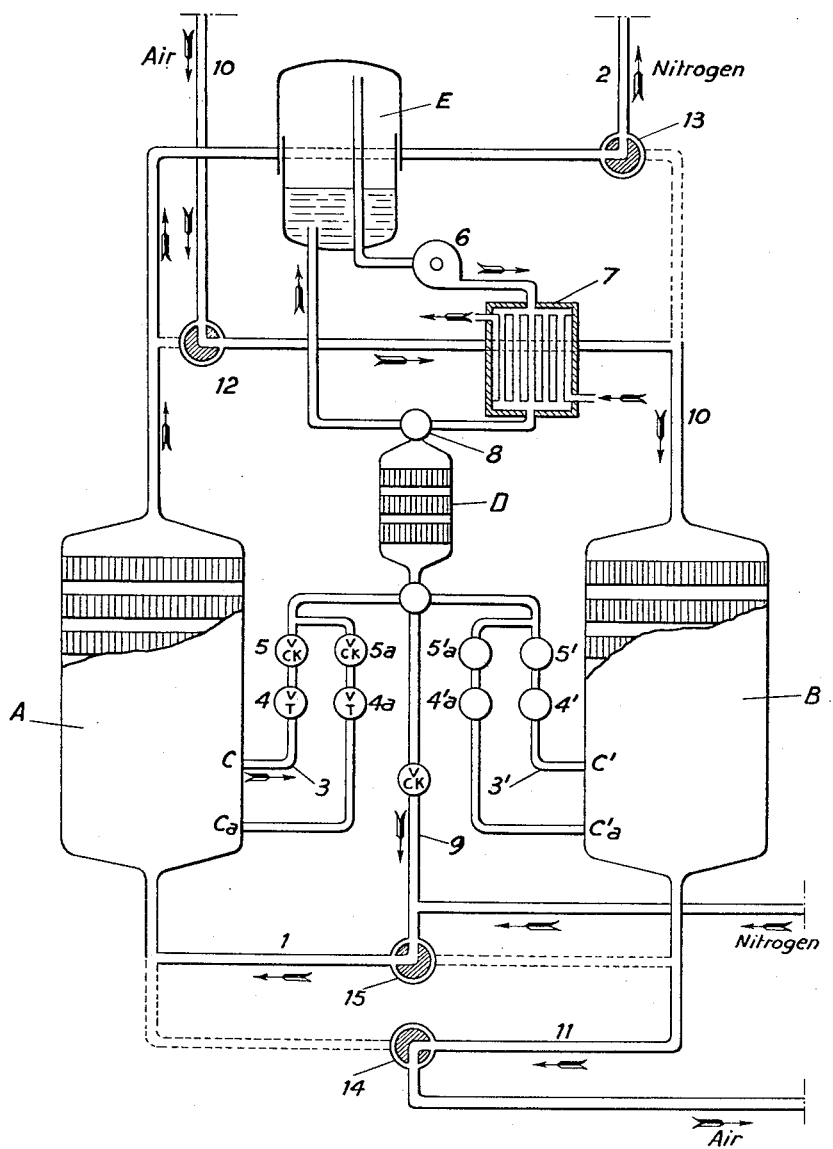

2,586,026

UNITED STATES PATENT OFFICE 2,586,026

PROCESS FOR THE REMOVAL OF CARBON DIOXIDE FROM GASES BY COOLING

Eugène Gomonet, Paris, France, assignor to L'Air Liquide, Societe Anonyme Pour l'Etude et l'Exploitation des Procedes Georges Claude, Paris, France Application July 8, 1949, Serial No. 103,697
In France July 21, 1948

7 Claims. (Cl. 62—175.5)

This invention relates to the separation of carbon dioxide from gases, especially air, and more particularly to the removal of carbon dioxide from air prior to its separation into its constituents by liquefaction and rectification.

In the separation of air into its constituents by liquefaction . . . and rectification, it is known that air may be cooled by passing it through regenerators operated alternately, or through counter-current heat exchangers with reversal of the flow circuits at regular intervals. The cooling of the regenerators or heat exchangers is effected by passing the cold nitrogen or oxygen produced through the same. When air to be separated is passed through the cold regenerator, the carbon dioxide contained in the air is deposited on the cold surfaces in the regenerator due to the cooling of the air and the removal of the carbon dioxide is so complete that separation of carbon dioxide by chemical treatment of the air is unnecessary. The carbon dioxide thus deposited is removed by sublimation when the cycle is reversed and the cold nitrogen and oxygen is passed through the regenerator.

In practice, it is essential for the practically complete removal of the carbon dioxide from the surfaces of the regenerator by sublimation that the mass of cold gases (oxygen or nitrogen) passed through the regenerator be greater than the mass of air (to be cooled) passed through the regenerator at least in the coldest part of the regenerator. For this purpose, heretofore it has been found necessary to separately treat an auxiliary mass of air, for instance, by chemical separation of carbon dioxide to obtain a quantity of air which, after addition to the air passed through the regenerator and separated into its constituents, would provide a sufficient excess of cold nitrogen and oxygen to practically completely remove the carbon dioxide from the regenerator by sublimation.

The principal object of this invention is to effect the complete elimination of carbon dioxide from a gas mixture such as air by cooling without auxiliary chemical decarbonation.

It has been found that, when a cold gas is passed through a regenerator while sublimating the carbon dioxide previously deposited in the regenerator from a gas to be cooled, the last portion of the cold gas leaving the regenerator is substantially free from carbon dioxide.

Consequently, my invention consists in using this last portion of cold gas as extra gas to increase the mass of the gases leaving from the separation plant, in order to practically completely remove the carbon dioxide from the regenerator in a later sublimation period.

In order to facilitate an understanding of the present invention, reference is made to the annexed drawing in which:

Fig. 1 is a schematic view of a portion of the apparatus for carrying out the present invention, and Fig. 2 is a similar view of a modified form of the apparatus.

In Fig. 1 showing one embodiment of the invention, there appears only the set of the two regenerators A and B used for the recuperation of the cold from a single one of the separated gases, nitrogen, for instance. At the upper part of the figure are shown the tubes 10 and 10' for the inflow of the air to be cooled and the tubes 2 and 2' for the outflow of nitrogen. At the lower part are shown the tubes 1 and 1', through which, by a set of pipes and valves, the air flows to the separation plant and the nitrogen discharged from the same flows to the regenerators. In the position of the valves, as shown, the regenerator A is in the cooling stage, with the cold nitrogen passing through the same, and the regenerator B is in the heating stage having the warm air passing through it. The pipe system with the valves in the positions indicated through which the gases actually pass is shown in full lines and the pipes not employed in the period in question are shown in dotted lines. The air during its cooling flows through 10' into the regenerative unit B and flows, after its cooling, to the separation plant through 11. The cold nitrogen flows through 1 into the regenerative unit A, and leaves therefrom as a whole at 2 during the greater portion of the period in question. During the last portion of this period, for instance, during the last tenth, the nitrogen is discharged wholly or partly through 3 and is collected in the gas-holder E. The position of the valves illustrated in Figure 1 corresponds to this last portion of the period. During the whole of this period, the gas which had been collected at the end of the previous period in the gas holder E from the regenerative unit B passes through pipe 12 and pipe 12' and is introduced into the cold end of the regenerative unit A where it is diluted in the main mass of the gases that it reheats slightly, thus enabling the deposited carbon dioxide to be sublimated.

It appears that in this embodiment, the gas portion which is collected towards the end of a period when discharged from a regenerator is diluted evenly during the whole next cooling period in the other regenerator. In the case when it is desired that the warmer part of the regenerator have a lesser amount of separated gas passed therethrough than the colder part, according to Patent No. 2,002,941, the removed portion is taken, not at the warm end of the regenerator, but at some point of the travel of the gases through the latter. As the removed gas is then cold, it is necessary to recover this cold which entails two auxiliary regenerators if, according to the first embodiment of the invention, the removed portion is diluted evenly in the main mass during the whole circulating period. But if the distribution is not even, if for instance the dilution, in the main mass, of the removed portion is only carried out during the first nine tenths of the cool period, while the removal is effected during the last tenth, according to a second embodiment, use may be made of only a single auxiliary regenerative unit. This single unit will then have cold gas drawn off during the last tenth of the period passed through it in one direction, and will have the warm gas leaving the gas holder and flowing back to the cool end of the main regenerative unit pass through it in the opposite direction during the remainder of the period.

According to a modification of this second embodiment of the invention, instead of removing, at a single point from the main regenerator, the above-mentioned portion, the same may be removed at several points in the path of the travel of the gas through the regenerative unit, the first of these points being located preferably above the level where the carbon dioxide has begun to deposit during the flow of the gases to be decarbonated, and the others located below this level.

Figure 2 shows diagrammatically the second embodiment of the invention adapted to an air-separating apparatus with alternately working regenerators. For the sake of simplicity, only the pair of the two regenerators A and B have been represented that are used for the recuperation of the cold from a single one of the separation products, nitrogen, for instance. The cool end of the regenerators is assumed to be below. For a circulation as indicated by the arrows, the compressed air flows through the pipe 10 into the regenerator B and leaves it in a cooled condition through 11. The cool nitrogen flows into the regenerator A through the pipe 1. As in the first embodiment as shown in Figure 1, the gas which has been collected at the end of the previous period in the gas holder E on leaving the regenerator B is passed through the valve 8 and pipe 9 to the cold end of the regenerator A, where it is diluted in the main mass of the nitrogen discharged from the separation plant and introduced through pipe 1. The difference between this embodiment and the first embodiment is that the gas from the holder E is introduced into the regenerator only during the first part of the period, for example, the first nine-tenths of the regenerator or cooling period. To effect the necessary removal of gas, a gas offtake is arranged at a level C of the regenerator, preferably just above the level where the carbon dioxide has begun to deposit during the generator warming period. The nitrogen that is removed at this level C during the last part, for example, the last tenth, of the period of the flow of nitrogen through A, flows out through the pipe 3 and throttle valve 4 for regulating the discharge, then through an automatically controlled check valve 5 opened only during the last portion of the generator cooling period. The opening of the valves 4 and 5 fixes the amount of withdrawn nitrogen which is varied according to the pressure of the compressed air flowing through the regenerative unit in the warm period. For instance, if this pressure is 5 atmospheres, about 3 to 5% of the nitrogen may be withdrawn, the drawing off being made during the last tenth of the regenerator cooling period; this time moreover may be altered over a fairly wide range without any inconvenience.

The nitrogen thus drawn off runs through a small auxiliary regenerator D where the nitrogen is reheated up to about the surrounding temperature, then flows into a gas holder E. During the greater part of the next period, it will be sucked from E by a pump 6 ensuring the circulation of the removed nitrogen, and then passed through a cooler 7 to the auxiliary regenerator D from which, through pipes and a valve (not shown, but similar to 8 and 9), it will flow out to be mixed with the nitrogen produced by the separating apparatus in order to proceed to the regenerator B.

The valve 8 is automatically controlled and is open only when the valve 5 is closed; these valves 5 and 8 furthermore may be joined together as a single two-way valve.

The flow of gases through regenerators A and B are reversed at regular intervals through a set of valves not shown, the regenerator B also being provided with a gas intake C' and with valves 4' and 5' that operate like the corresponding parts of the regenerator A.

Instead of a single gas intake C per regenerator, it may be of advantage to provide one or more other additional intakes at levels lower than C, as Ca, each of these intakes being regulated through a throttle valve 4a and optionally a check valve 5a, the remainder of the drawn off gas circuit being common to all these intakes.

What I claim is:

1. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the steps of collecting a portion of cooling gas passed through the regenerator in one cooling period near the end of the cooling period and which is substantially free from carbon dioxide, retaining the collected gas, and adding the so collected gas to cooling gas used in a subsequent cooling period to provide a mass of cooling gas in excess of the gas from which the carbon dioxide is to be separated.

2. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the steps of removing from the regenerator at a point in the path of travel of the cooling gas therethrough a portion of cooling gas passed through the regenerator in one cooling period near the end of the cooling period after most of the carbon dioxide has been removed from the regenerator and which is substantially free from carbon dioxide, collecting the removed gas, and adding the so collected gas to cooling gas used in a subsequent cooling period to provide a mass of cooling gas in excess of the gas from which the carbon dioxide is to be separated.

3. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the steps of removing from the regenerator at a plurality of points in the path of travel of the cooling gas therethrough a portion of cooling gas passed through the regenerator in one cooling period near the end of the cooling period after most of the carbon dioxide has been removed from the regenerator and which is substantially free from carbon dioxide, collecting the removed gas, and adding the so collected gas to cooling gas used in a subsequent cooling period to provide a mass of cooling gas in excess of the gas from which the carbon dioxide is to be separated.

4. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the step of adding a portion of cooling gas passed through the regenerator in one cooling period near the end of this cooling period, which portion is substantially free from carbon dioxide to cooling gas used in a subsequent cooling period to provide a mass of cooling gas in excess of the gas from which the carbon dioxide is to be separated.

5. In a method of separating carbon dioxide from gases by alternately passing cooling gas and gases from which the carbon dioxide is to be separated through regenerators to separate the carbon dioxide as a deposit by refrigeration and to remove the deposited carbon dioxide by sublimating in the cooling gas, the step of adding a portion of cooling gas removed from the regenerator at a point in the path of its travel therethrough in a cooling period near the end of this cooling period, which portion is substantially free from carbon dioxide, to cooling gas used in a subsequent cooling period to provide a mass of cooling gas in excess of the gas from which the carbon dioxide is to be separated.

6. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the step of adding a portion of cooling gas removed from the regenerator at a plurality of points in the path of its travel therethrough in a cooling period near the end of this cooling period, which portion is substantially free from carbon dioxide, to cooling gas used in a subsequent cooling period to provide a mass of cooling gas in excess of the gas from which the carbon dioxide is to be separated.

7. In a method of separating carbon dioxide from gases by alternately passing cooling gas and gases from which carbon dioxide is to be separated through regenerators to separate the carbon dioxide as a deposit by refrigeration and to remove the deposited carbon dioxide by sublimating in the cooling gas, the steps of removing from the regenerator at a point in the path of travel of the cooling gas therethrough a portion of cooling gas passed through the regenerator in one cooling period near the end of the cooling period and which is substantially free from carbon dioxide, recovering the cold of this portion of cooling gas in an auxiliary regenerator, collecting the said portion, cooling it again by passing through the same auxiliary regenerator, and adding the so collected gas to cooling gas used in a subsequent cooling period to provide a mass of cooling gas in excess of the gas from which the carbon dioxide is to be separated.

EUGÈNE GOMONET.

REFERENCES CITED

The following references are of record in the file of this patent:

UNITED STATES PATENTS

| Number | Name | Date |
|---|---|---|
| 2,097,434 | De Baufre | Nov. 2, 1937 |
| 2,113,680 | De Baufre | Apr. 12, 1938 |